Figure 1:
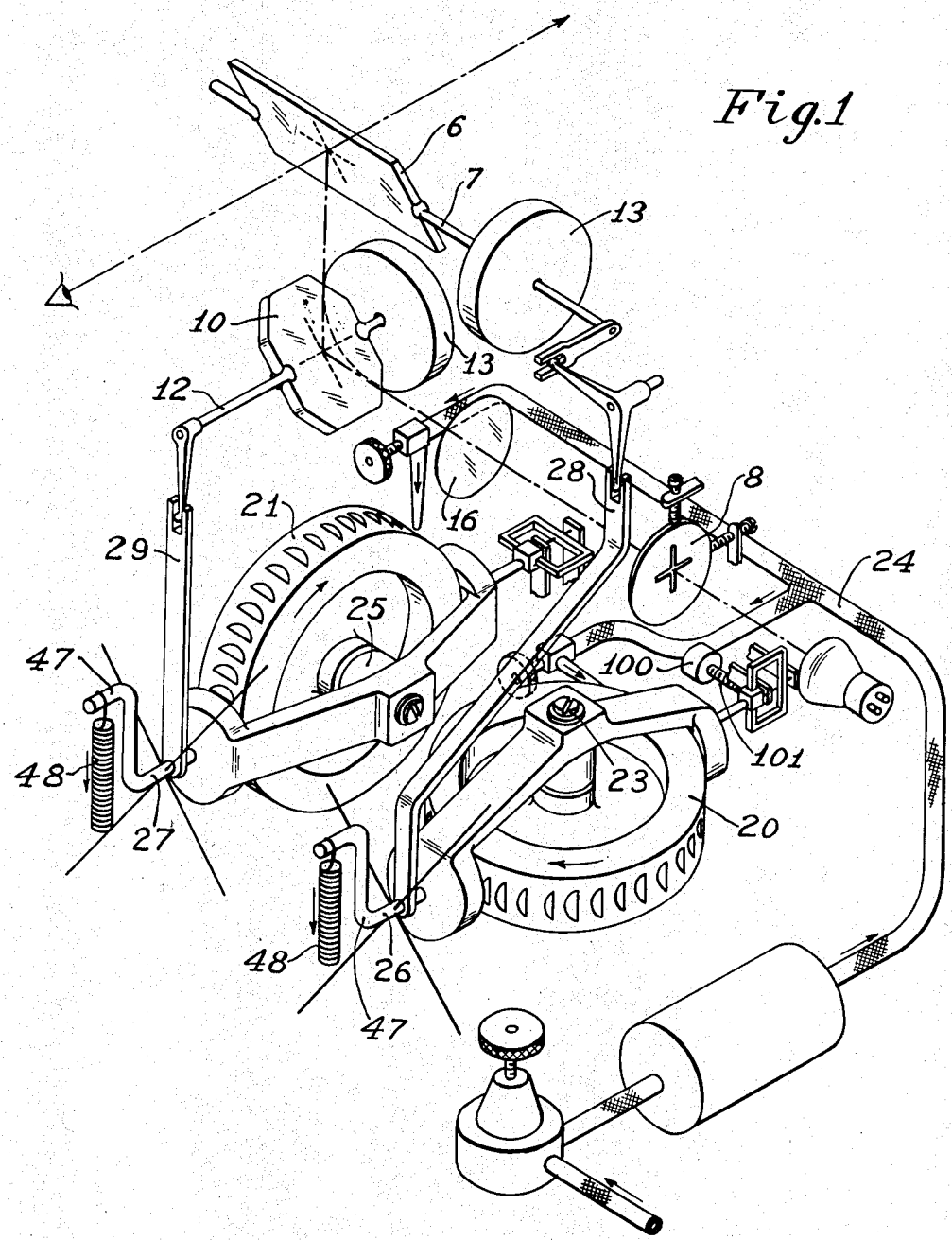

July 3, 1956     E. P. BENTLEY ET AL     2,752,684
GYROSCOPIC APPARATUS

Original Filed June 3, 1943     3 Sheets-Sheet 1

Inventors
Edward P. Bentley
Charles S. Draper
by their attorney
Melvin R. Jenney July 3, 1956
E. P. BENTLEY ET AL
2,752,684
GYROSCOPIC APPARATUS
Original Filed June 3, 1943
3 Sheets-Sheet 2
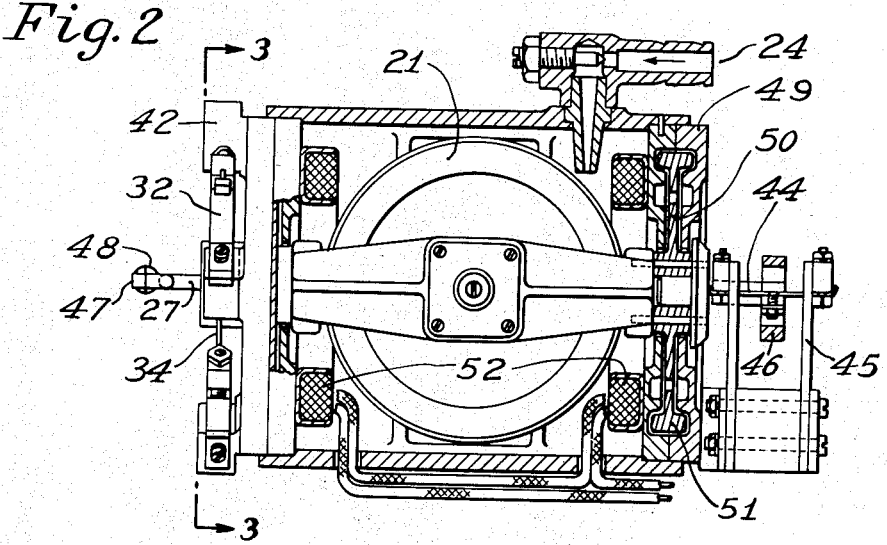
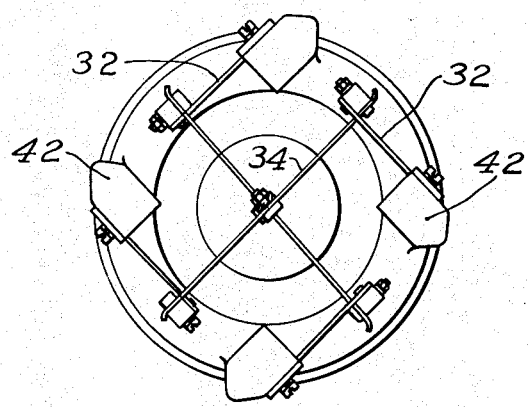
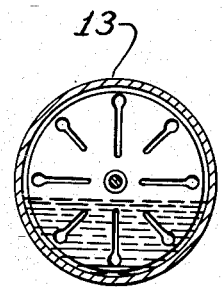
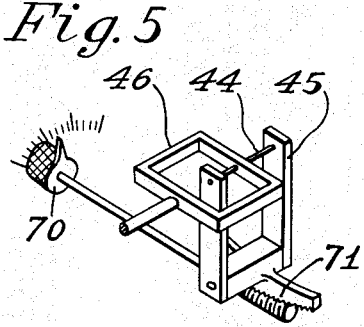
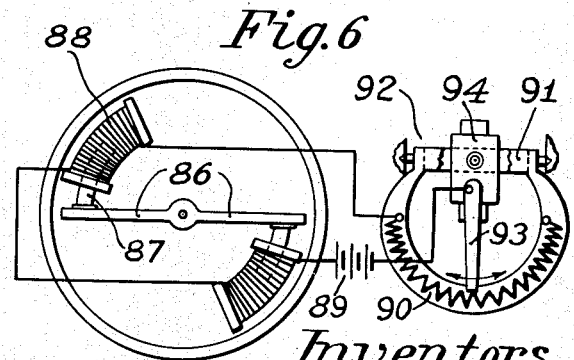
Inventors
Edward P. Bentley
Charles S. Draper
by their attorney
Melvin R. Jenney July 3, 1956  E. P. BENTLEY ET AL  2,752,684
GYROSCOPIC APPARATUS
Original Filed June 3, 1943  3 Sheets-Sheet 3

Inventors
Edward P. Bentley
Charles S. Draper
by their attorney
Melvin R. Jenney

United States Patent Office 2,752,684
Patented July 3, 1956

2,752,684
GYROSCOPIC APPARATUS

Edward P. Bentley, Waltham, and Charles S. Draper, Newton, Mass., assignors, by mesne assignments, to Research Corporation, New York, N. Y., a corporation of New York Continuation of application Serial No. 489,566, June 3, 1943. This application January 4, 1951, Serial No. 204,461

23 Claims. (Cl. 33—46.5)

The present invention relates to gyroscopic angular measuring apparatus, and is particularly concerned with lead measuring devices suitable for uses in bombsights. This application is a continuation of our abandoned application Serial No. 489,566, filed June 3, 1943.

The principal object of the present invention is to provide a gyroscopic system having integrating properties useful in certain navigating systems, as will hereinafter appear.

Another object of the present invention is to provide means for controlling the flight of bomb-dropping aircraft in a manner to insure that a bomb dropped at any point of the flight path will take the correct, or approximately correct, path to the target. Subsidiary objects are to provide devices which will determine the correct flight path regardless of range, speed and direction of the target, head and cross winds, and the effect of gravity; in short, to provide means for improving the accuracy of bombing without necessitating bomb release at any particular point in space or instant of time.

With these objects in view and other objects as will hereinafter appear, the principal feature of the invention contemplates a gyroscope having a single degree of freedom about an output axis (herein defined as a "precession" axis) with damping but without elastic restraint about said axis. As used in a bombsight, the invention utilizes said gyroscope to control the flight path of aircraft whereby the aircraft may be flown in a manner to maintain a line of sight continuously on the target and under such circumstances that after the line of sight has been fixed on the target for a short time the bomb may be released. The particular construction of the apparatus may take several forms, one of which is similar to the anti-aircraft fire control instrument shown in our co-pending application Serial Number 440,660, filed April 27, 1942, now Patent No. 2,609,606, granted September 9, 1952.

The apparatus described in our co-pending application comprises two elastically restrained damped gyros. For the purposes of the present invention similar gyros are used except that for reasons to be made apparent later they are elastically unrestrained. The gyros are used to control a line of sight which is offset with respect to the flight path of the aircraft. As will be shown later this construction provides remarkable freedom from most disturbing influences such as range, wind and target motion. The only substantial correction is that required for the effect of gravity and this is readily accomplished by means constituting another feature of the invention.

Figure 10:
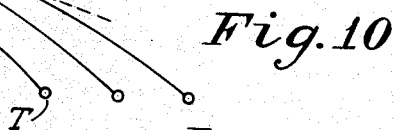
Figure 11:
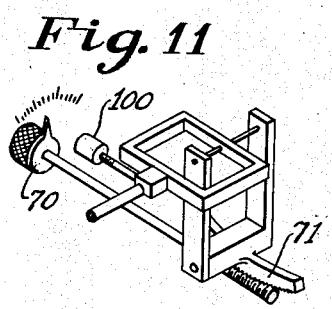

In the accompanying drawings Fig. 1 is a perspective view of the apparatus; Fig. 2 is a sectional elevation of one of the gyro units; Fig. 3 is a section on line 3—3 of Fig. 2; Fig. 4 is a sectional detail showing the damping arrangement; Fig. 5 is a detail view illustrating means for introducing a bias torque; Fig. 6 is a detail view of other means for introducing a bias torque; Figs. 7 to 10 are diagrams illustrating the operation of the apparatus; and Fig. 11 is a detail view illustrating still other means for introducing a bias torque.

As shown in Fig. 1 the unit comprises two gyros mounted in a fixed position in the airplane. It is provided with an optical system through which the pilot sights on the target while maneuvering the plane to maintain the line of sight on the target. The optical system comprises a plain plate glass or unsilvered mirror 6 which is normally mounted in a 45° position on the horizontal axis 7. An image of a reticle 8 is reflected from a second mirror 10 on the mirror 6. The mirror 10 is positioned at an angle of 45° about the fore-and-aft horizontal axis 12. Each mirror is preferably heavily damped about its axis of rotation as by means of fixed oil-containing housings 13. The image of the reticle is directed through a collimating lens 16 which focuses the observed image at infinity.

Two gyros 20 and 21 are shown. The gyroscope 20 has its wheel mounted on a vertical spin axis 23 while the gyroscope 21 has its wheel mounted for rotation about a spin axis 25 transverse to the fore-and-aft axis of the aircraft. The wheels are air-spun at constant speed by means indicated generally at 24. Angular movement of the aircraft in elevation will cause precession of the gyro 20 and turning movements of the aircraft will cause precession of the gyro 21. The precession axis of the gyros 20 and 21 are indicated at 26 and 27 respectively. The operating system for the mirrors comprises linkages 28 and 29 connected from the respective precession axes to the mirror axes 7 and 12. Angular motion of the craft in elevation will, through the action of the gyro 20 cause tilting of the mirror 6, while angular turning motions will cause angular motion of the mirror 10 through the gyroscope 21. All significant motions may be resolved into component motions of the two gyros whereby any motion of the aircraft in space will cause a deflection of the line of sight as observed by the pilot through the image of the reticle on the mirror 6.

The construction of one of the gyro units, namely the turn gyro 21, is shown in Figs. 2 and 3. The elevation gyro is exactly similar and need not be separately described. One trunnion, shown as the rear trunnion of the gyro, is supported by means of a plurality of tangentially directed leaf springs 32 symmetrically arranged around each trunnion and connected thereto by radial cross wires 34. At the outer ends each wire is clamped to the free end of the respective spring 32. The springs 32 are anchored to the casing by being clamped in ears 42 extending from the rear of the casing. The front trunnion of the gyroscope is preferably supported by a tensioned axial wire 44 mounted in a U-shaped bracket having spring arms 45. To the gyro trunnion an open framework 46 is secured, the legs of which pass around the inner arm of the U-shaped bracket.

The supporting wires 34 and 44, by their resistance to twisting, provide a centralizing torque for the gyro. As will be shown later, the sight is independent of range if the centralizing torque can be made zero. Means are therefore provided for cancelling or neutralizing the centralizing torque. This is accomplished by the arrangement shown in Fig. 1 wherein the trunnions 26 and 27 are each provided with an offset 47 to which is connected a coil spring member 48. Spring 48 is secured to a fixed part of the casing at the end opposite the offset 47. It will be observed that when the gyro is in its zero position the spring 48 applies no torque but that upon precessional motion of the gyro whereby the part 47 is moved from its central position the spring 48 applies a torque tending to move the member 47 still farther from its central position. This is equivalent to a toggle, the action of which can be made to balance the centralizing torque exactly or nearly exactly and thus to give the equivalent of a completely free support. If desired, the unit may be journaled in bearings, but the support here described is preferred because it avoids erratic effects due to friction.

It is also important that the precessional movements be heavily damped. Preferably the damping device is of such a form that it also suppresses any bouncing or oscillation of the gyroscope in its spring supports. Such damping means is shown as in the form of circular oil containers 49 placed at each end of the gyro casing, and which are partially filled with heavy oil. A disc-like member 50 secured to the trunnion or rotor frame is placed within each container. Preferably, the members 50 have axially extending or rim portions 51 at their periphery, the housing 49 closely surrounding but not touching the same. These discs therefore interpose a damping resistance to translatory oscillations of the gyro frame in any plane, as well as to rotary movements due to precession. The rims also materially aid in the effective damping of the precessional movements.

It is important that the damping coefficient remain substantially constant in order that the proper "characteristic time" of the gyroscope may be preserved. To this end, we prefer to incorporate in the gyro housing a means for maintaining the temperature of the damping fluid constant, which may be achieved by utilizing electrical heating coils 52 placed next to the containers 49 controlled by a thermostatic means (not shown) adjusted to maintain the temperature at a fixed point higher than would be met at any time from natural causes. A temperature well above 100° is suggested for the purpose.

Since the gyros are elastically unrestrained, a caging device is provided, and this may take any conventional form.

The operation of the apparatus will first be explained by showing its determination of a flight course under various idealized conditions. First, only components of motion in a horizontal plane will be considered, where no effects of gravity appear. These components in a horizontal plane are fully accounted for by the turn-sensitive gyro 21.

In the case of an airplane approaching a stationary target, without cross wind, the gyro indicates a zero lead angle. By flying with the reticle always on the target, the pilot determines a collision course. Hence, a bomb dropped at any point of the flight path will follow the same course to the target.

Figure 7:
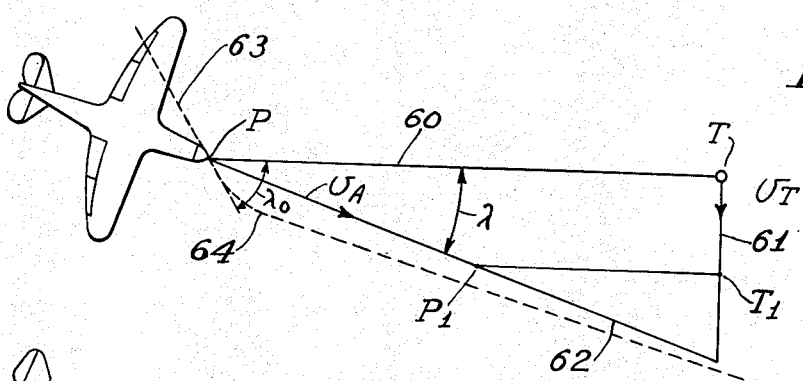

In Fig. 7 is shown the condition for a target T moving across the line of sight. When the aircraft is at P the line of sight between P and T is 60, the target path is 61, and the "collision course" of the airplane is 62. The velocities of the airplane and target are represented by the vectors $v_A$ and $v_T$. There is a constant lead angle $\lambda$ between the line of flight and the line of sight. There is only one constant angle $\lambda$ that will dictate a straight course of the airplane and also maintain the reticle fixed on the target throughout the path. For example, when the airplane reaches $P_1$ and the target reaches $T_1$, there will be the same constant lead angle between the line of sight and the collision course.

The foregoing illustrates what may be termed the "steady-state" condition; it assumes that the correct lead angle has been introduced and that the pilot has been flying the collision course 62 for a sufficient time to wipe out all transient effects. It will now be shown that the pilot, in flying the plane in on any course, will necessarily bring the airplane on to a collision course, if he so flies the airplane that the reticle bears continuously on the target.

Suppose that the pilot is flying the course indicated by the dotted line 63, and that at a point P the reticle bears on the target with an original lead angle $\lambda_0$. For purposes of theoretical discussion this initial angle $\lambda_0$ may be of any value, although in practice, it would be natural for the pilot to come in on an estimated collision course and uncage the gyro in such a way as to indicate an approximately correct lead angle. However, assuming a fairly large initial lead angle, as shown by Fig. 7, the pilot will find that although the reticle is on the target momentarily at point P, it cannot be held on the target without turning to the left as indicated by 64. The exact course taken from there, on the assumption that the pilot flies in such a way as to hold the reticle continuously on the target, can be determined by the transient solution of a differential equation, to which reference will be made later. The path 64 approaches a straight line, which is a collision course differing from the course 62 and intersecting the path of the target at a different angle. The curved portion of the path 64 represents a "transient" which dies out rapidly.

The effect of cross-wind is also illustrated by Fig. 7. Assume that the target is stationary and that a cross-wind is blowing from the right. To keep the reticle on the target it is necessary to maintain a heading at an angle $\lambda$ to the line of sight. The flight path with respect to ground will correspond in this case with the line of sight 60. This line of flight is therefore a collision course with respect to the target. If the bomb is released at any point of the path, it will continue at the same velocity and direction as the airplane. This neglects the sidewise acceleration of the bomb under the action of the cross-wind, but the deviation of a heavy bomb under this acceleration is negligible.

Figure 8:
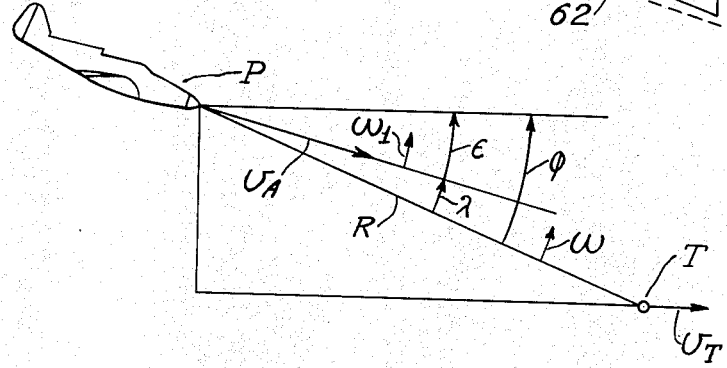

The conditions as viewed in the vertical plane are similar. Neglecting gravity for the sake of simplicity in preliminary explanation, Fig. 8 shows how the elevation gyro indicates the proper lead angle, whereby the airplane flies at a certain angle $\epsilon$ from the horizontal for a collision course with a moving target. Since the bomb is released at the same velocity as the aircraft and is here assumed to continue at that velocity, it may be released at any point in the path.

The effect of head or tail wind is merely to change the ground speed of the airplane and thus to change the relative velocity whereby the lead angle is automatically brought to the correct value. As in the case of the cross-wind above described, the wind accelerates the bomb after release, but the deviation due to this cause is usually negligible.

Since any motion may be resolved into components handled independently by the two gyros, the proper flight path is determined simply by holding the reticle on the target.

Before passing to a consideration of the effect of gravity, we shall now discuss the theory of operation under the idealized conditions assumed above. Gravity will later be accounted for by compensating means. For satisfactory operation, certain relationships must be maintained between the physical constants. These relationships will be developed by dynamic analysis for one gyro only, namely, the elevation gyro, since the same principles apply to the other gyro. In Fig. 8, let:

$\epsilon$ = angle of flight path as measured from the flight path to some reference line, here horizontal
$\varphi$ = angle from the line of sight to the same reference line
$\lambda$ = indicated lead angle = $\varphi - \epsilon$
$\theta$ = angle of precession of the gyro from neutral position
$S_i = \frac{\lambda}{\theta}$ = sensitivity of the optical system
$c$ = coefficient of damping about the axis of precession
$k$ = net elastic coefficient due to the gyro suspension and springs
$H$ = angular momentum of the gyro rotor about its spin axis
$\omega_1$ = angular velocity of the airplane in its flight path
$\omega$ = angular velocity of the line of sight According to the conventions herein adopted as shown in Fig. 8, $$\omega_1 = \omega + \frac{d\lambda}{dt}$$

Then, from gyro theory, the precessional torque is $$H\omega_1 = H\left(\omega + \frac{d\lambda}{dt}\right) \quad (1)$$

This torque is resisted by the inertial torque, the damping torque and the elastic restoring torque. The inertial torque is small and is here neglected for simplicity, since it does not materially affect the conclusions. Hence $$c\frac{d\theta}{dt} + k\theta = H\left(\omega + \frac{d\lambda}{dt}\right) \quad (2)$$

By virtue of the optical system the indicated lead angle $\lambda$ is proportional to $\theta$. The angle $\theta$ is held to small values, preferably not more than 2° from the zero position, and a sensitive linkage is relied on to indicate sufficiently large values of $\lambda$.

Since $$\theta = \frac{\lambda}{S_i}$$

$$\left(\frac{c}{HS_i} - 1\right)\frac{d\lambda}{dt} + \frac{k}{HS_i}\lambda = \omega \quad (3)$$

The quantities $c$, $H$ and $S_i$ are characteristics of the instrument, hence the coefficient of $$\frac{d\lambda}{dt}$$

may be taken as a design constant. Let $$\frac{c}{HS_i} - 1 = \sigma$$

Then the differential equation becomes $$\sigma\frac{d\lambda}{dt} + \frac{k}{HS_i}\lambda = \omega \quad (4)$$

The invention contemplates that the net elastic coefficient should be zero, or nearly so. Hence the equation reduces simply to $$\sigma\frac{d\lambda}{dt} - \omega = 0 \quad (5)$$

It can be shown from the geometry of Fig. 8 that in any case $$\omega = \frac{V_A}{R}\left[\frac{V_T}{V_A}\sin\varphi - \sin\lambda\right] \quad (6)$$

where $V_A$ is the velocity of the aircraft, $V_T$ the component of target velocity in the plane illustrated by Fig. 8, and R is the range.

Then (5) becomes $$\sigma\frac{d\lambda}{dt} + \frac{V_A}{R}\left[\sin\lambda - \frac{V_T}{V_A}\sin\varphi\right] = 0 \quad (7)$$

with a "steady-state" solution of $$\sin\lambda = \frac{V_T}{V_A}\sin\varphi \quad (8)$$

Thus, when the gyro has settled down, so that $$\omega = 0 \text{ and } \frac{d\lambda}{dt} \text{ likewise equals } 0$$

the device indicates a constant lead angle determined by (8). The value of $\lambda$ given by this equation is the proper lead angle for predicting the collision course. To maintain this constant lead angle, absence of restoring torque is necessary and this accounts for the requirement that $k = 0$.

The transient effects are best determined by going back to (5). Since $$\omega = -\frac{d\varphi}{dt}$$

(5) becomes $$\sigma d\lambda + d\varphi = 0$$

Then $$\sigma\lambda + \varphi = C$$

the constant being determined by the fact that at some initial point when the reticle is first brought to bear on the target, $$\varphi = \varphi_0 \text{ and } \lambda = \lambda_0$$

Therefore $$\sigma(\lambda - \lambda_0) + (\varphi - \varphi_0) = 0 \quad (9)$$

This is itself a differential equation since $\lambda$ is the angle between the line of sight and a tangent to the flight path. The solution shows that the transient error dies out approximately in proportion to $$\left(\frac{R}{R_0}\right)^{\frac{1}{\sigma}}$$

where $R_0$ is the distance to the target from the initial point at which the reticle is brought to bear on the target.

This indicates that $\sigma$ should be small. For example, with $\sigma = 0.2$, the error reduces to $\frac{1}{32}$ of its initial value in traversing half the distance from the initial point to the point of ultimate collision. Thus in Fig. 7, the initial "error" is the angle between lines 62 and 64. After traversing half the distance to the target, the line 64 will differ from a true collision course by about $\frac{1}{32}$ of that initial error. In any actual case the pilot will be able to initiate the action with an error of only a few degrees, hence the error will be insignificant after traveling a relatively short distance.

It should be noted that $\sigma$ is a net damping coefficient. The quantity $$H\frac{d\lambda}{dt}$$

is a torque which depends on the fact that the information conveyed to the pilot is based entirely on the line of sight, while the only control at the disposal of the pilot is his ability to maneuver the airplane. This quantity $$H\frac{d\lambda}{dt}$$

is a torque which inherently tends to produce instability. The tendency to produce instability is removed by the dissipative torque $$\frac{c}{S_i}\frac{d\lambda}{dt}$$

The dissipative torque must be greater than the torque that tends to produce instability, that is, $\sigma$ must be greater than zero.

If $\sigma$ were made exactly zero, there would theoretically be no transient. It must be remembered, however, that the foregoing analysis accounts for gyro characteristics only and does not account for the dynamic characteristics of the aircraft. A condition of $\sigma = 0$ would be physically significant only if it were possible to bring the airplane suddenly on to the correct path, for which an infinite acceleration would be required. If $\sigma$ were negative, it would be impossible for the pilot, by any natural responses, to hold the line of sight on the target. In such a case the system of pilot, airplane and instrument would be "unstable." Therefore, $\sigma$ must always be positive, and must be sufficiently greater than zero to avoid the chance of its accidentally becoming negative through some slight variation in the gyro constants. Practically, $\sigma$ may be of any value from about 0.05 to 0.5.

It may be noted that the expression for $\sigma$ includes a term in $S_i$, the optical sensitivity. For a desired value of $\sigma$, the greater the sensitivity, the greater must be the damping coefficient.

From the foregoing it will be observed that the gyros are used in somewhat different manner from conventional gyro operation. Gyros are usually used in one of two ways, namely, to indicate a fixed position in space, as in a flight indicator; and to measure a rate of turn, as in a turn indicator. The present invention is more properly viewed as a "null indicator," since it gives an indication of zero angular velocity of the line of sight. While the gyro axes remain in constant position after the gyros have settled down, that constant position is not related to any earthbound coordinates, but is determined only by the condition of zero angular velocity when the proper flight path is determined with relation to the objective.

The foregoing analysis is directed to the specific operation of the bombsight system. In general, the integrating properties of the single-degree-of-freedom gyro with damping and without elastic restraint are indicated by the following equation:

$$c \frac{d\theta}{dt} = H\omega \quad (2a)$$

which is the same as (2) except that $k$ is taken equal to zero and the term involving $\lambda$ is omitted. Upon integrating $$\theta = \frac{H}{c} \int \omega \, dt \quad (2b)$$

The time-integral of $\omega$ is itself an angle, namely, the total angle through which the gyro has turned in inertial space; hence the angle $\theta$, through which the gyro turns in its suspension, may be used as a measure of angular motion in inertial space.

In its broader aspects, the invention contemplates a system utilizing a single-degree-of-freedom gyro, damped but elastically unrestrained about its output axis, together with a controlled member, on which the gyro is mounted, and means for operating the controlled member to maintain the gyro in a fixed angular deflection in its mount, which deflection may be zero, as in the case of an aircraft flying a collision course toward a stationary target.

A feature of importance lies in the fact that certain compensating or reference torques, hereinafter termed "bias torques," may be readily introduced about the output or precession axis of the gyro. In two-degree-of-freedom gyros, compensating torques must ordinarily be applied about an axis other than the output axis, and the gyro is compelled to respond thereto by a complicated erecting motion. According to the present invention such torques are directly applied to the output axis of each gyro, and are readily accounted for. This will now be illustrated by the application of bias torques to the gyros to compensate for the effect of gravity on the released bomb.

Figure 9:
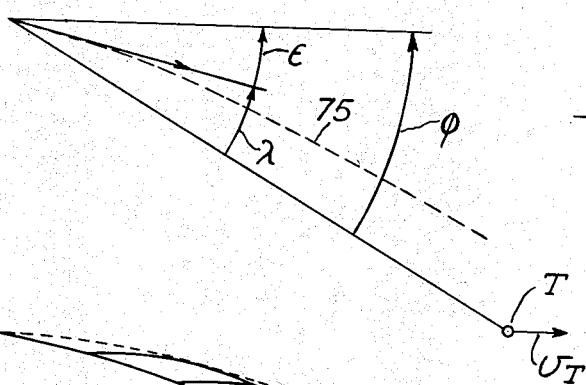

To compensate for gravity, it is necessary to fly with some "superelevation," as indicated by Fig. 9, whereby the bomb, after release, will follow a curved trajectory 75 to the target. Superelevation is introduced into the elevation gyro by applying a bias torque. This may be conveniently accomplished by a manual setting knob 70 operating to tilt the bracket through a worm drive 71, as shown in Fig. 5. Let the bias torque be represented by T. Then Equation 7 becomes $$\sigma \frac{d\lambda}{dt} + \frac{V_A}{R}\left[\sin \lambda - \frac{V_T}{V_A}\sin \varphi\right] = \frac{T}{H} \quad (10)$$

an approximate steady state solution for which is $$\sin \lambda = \frac{V_T}{V_A} \sin \varphi + \frac{R}{V_A} \frac{T}{H} \quad (11)$$

The term $$\frac{V_T}{V_A}\sin \varphi$$

represents, as in (8), that part of the lead angle which predicts the collision course. It can be shown that the superelevation required to correct for gravity is approximately $$\frac{Rg}{2V_A^2}\cos \epsilon \quad (12)$$

wherefore the proper superelevation will be introduced if T is proportional to $\cos \epsilon$ and inversely proportional to $V_A^2$. The bias torque is independent of range, but it must be adjusted for angle of the flight path from the horizontal and also for airplane velocity. If the velocity is kept nearly constant the only necesary adjustment is for the angle of the flight path.

Since the aircraft will ordinarily be used for but one type of bombing, a set adjustment will usually suffice. Thus, for very low level bombing, $\cos \epsilon$ may be taken as 1. For dive bombing at high angles, the superelevation is so small that a constant value for $\epsilon$ may be assumed, and no appreciable error will be introduced by variations of $\epsilon$ from the assumed value.

If the airplane is to be used for various types of service, with considerable variation of $\epsilon$, the pilot may be relieved of the necessity of adjusting the bias torque, by providing a connection with the flight indicator or gyro vertical of the airplane, as diagrammatically shown in Fig. 6. The pointer of the gyro vertical moves with relation to a rheostat to control the current to bias-control solenoids, the armatures of which are connected to the precession axis of the elevation gyro. One trunnion of the elevation gyro 20 is provided with radial arms 86 carrying arc-shaped armatures 87 entering solenoids 88. The solenoids are variably excited by a connection through a battery 89 and a rheostat 90. The rheostat is mounted on the gimbal ring 91 of the flight indicator 92. A movable rheostat arm 93 is mounted for movement with the gyro element 94. Since the axis of the element 94 maintains a substantially vertical position in space at all times, the position of the arm 93 with respect to the rheostat 90, and hence the current in the solenoids 88, is a measure of the angle of the longitudinal axis of the aircraft from horizontal. The rheostat is "tapered" to apply a bias torque proportional to $\cos \epsilon$.

The preferred method of introducing superelevation torque is by means of a weight 100 applied to an arm 101 attached to the supporting wire of the elevation gyro. Let M be the mass of the weight and b its distance from the axis. Then the bias torque due to gravity is $Mbg \cos \epsilon$. However, the weight is subject to other forces due to the curvature of the path. The torque due to these forces is $$MbV_A\omega_1 = MbV_A\left(\omega + \frac{d\lambda}{dt}\right)$$

The differential Equation 11 modified to take account of these several torques is $$\sigma'\frac{d\lambda}{dt} + \frac{V_A}{R}\left(\sin \lambda - \frac{V_T}{V_A}\sin \phi\right) = \frac{\frac{Mbg}{H}}{1+\frac{MbV_A}{H}} \cos \epsilon \quad (13)$$

where $$\sigma' = \frac{\frac{c}{HS_i} - 1 - \frac{MbV_A}{H}}{1+\frac{MbV_A}{H}} \quad (14)$$

An approximate "steady state" solution of 13, neglecting the dynamic error due to changes in $\lambda$ from following a curved path is $$\sin \lambda = \frac{V_T}{V_A}\sin \phi + \frac{R}{V_A} \frac{Mbg \cos \epsilon}{H\left(1+\frac{MbV_A}{H}\right)} \quad (15)$$

It will be observed that 15 involves a target-speed term and a gravity-correction term. The target speed term accords with that previously developed for the collision course. This leaves only the gravity-correction term to consider. This term is proportional to range and to cosine of the angle $\epsilon$. If the airplane velocity is assumed constant, and if the weight is chosen so that $$\frac{MbV_A}{H}=1 \qquad (16)$$

the lead angle corresponds to 12 and is correct (within the limits of approximation of the superelevation formula) for all values of $\epsilon$ and for all ranges.

In examining 13 for transient solutions, it is noted that the coefficient of $$\frac{d\lambda}{dt}$$

now includes a term involving the speed of the airplane, that is $$\sigma'=\frac{\frac{c}{HS_i}-2}{2}$$

if 16 is satisfied. $\sigma'$ should be between 0.05 and 0.5, and this merely requires more damping than in the gyro without the bias wieght. Some variation of $\sigma'$ with changes in speed will occur, and for this reason it is best not to use too small a normal value of $\sigma'$, since an increase in speed might bring its value too close to zero.

Referring to 14 it will be noted that if $V_A$ changes, a compensating change may be made in $b$ to keep $\sigma'$ constant. This may be done manually by setting the weight 100 at different positions on the arm 101.

Combinations of the several bias torque devices may be used. For example, it is found that the application of a fixed torque, as indicated in Fig. 5, gives a flight path which is a circle. The path is ordinarily too high if reliance is placed entirely on the fixed torque, but for high-speed aircraft the error is not great. By using a fixed torque together with a small weight, as shown in Fig. 11, the path may be correctly dictated for widely varying conditions. In all cases where the approximate equations used herein are not sufficiently accurate, manual adjustments may be made, preferably by adjusting the knob shown in Fig. 5.

The resistance of the air to the passage of the bomb produces an effect similar to that of gravity (although much less in magnitude) in that it would cause the bomb to fall short of the target. This effect varies with $\epsilon$ in much the same way as gravity, and may be accounted for by calibrating the bias-torque correction to introduce a slightly greater superelevation than that called for by gravity.

The axis 26 of the elevation gyro is preferably horizontal when the airplane is in level flight but may be at an angle therefrom. In the latter case, if a weight is used for superelevation torque, the effective mass used in the foregoing equations is the actual mass multiplied by the cosine of the angle of the axis from the horizontal.

An examination of the flight path dictated by the present invention is interesting. If a number of possible bomb trajectories to a target are considered, it will be seen that the flight path dictated by holding the reticle on the target is the envelope of such trajectories. This is illustrated by Fig. 10 wherein several trajectories toward a moving target are shown in full lines, and the flight path in dash lines. The bomb may be released at any point of the dash-line path.

To recapitulate, the system may be considered as a means for computing a lead depending on two types of actions, first those in which the effect on the bomb is the same as on the airplane, and second those in which the effect on the bomb differs from that on the airplane.

The first class of actions includes such factors as cross and head winds and motion of the target, all of which result in a fixed angular lead. Since these factors enter into the motion of the aircraft they are automatically computed in the value of the lead angle necessary for proper flight of the bomb after release. The second class of actions includes gravity and air resistance, which act on the bomb from the instant of release throughout its trajectory but which do not affect the motion of the aircraft with respect to the target. These latter actions are handled by correction or bias torques applied to the appropriate gyro.

In operation, the pilot flies the plane in an approximate course, preferably taking mental account of target speed and other variable factors. The gyros are then uncaged. The pilo maneuvers the plane in such a way as to maintain the reticle on the target. The time necessary to bring the reticle on the target will generally exceed the settling time of the gyros, and the pilot may feel confident that the flight path is then such as to predict (within the limits of accuracy of the apparatus) the envelope of all possible bomb trajectories from aircraft to target. The pilot may operate the bomb release at any instant. It is unnecessary to choose any particular instant for release. It will be understood that the term "line of sight," as used herein, means any line extending from the aircraft to be brought to bear on the objective, and is not limited to means relying on the direct vision of an occupant of the craft, but may be a line whose direction is indicated by any means, as by radio waves, fog-penetrating rays, and the like, as will be clear to those skilled in the art. In other respects also the invention is not limited to the particular embodiments herein shown and described, but may be modified within the scope of the appended claims.

Having thus described the invention, we claim:

1. An angular lead measuring device to direct a moving body toward an objective comprising means for indicating a line of sight, an angular rate gyro to be turned with said body and capable of precession, said precession being substantially free of elastic restraint, connections for operating the indicating means in proportion to the precession whereby the line of sight from the body to the objective is displaced angularly from the path of motion, and means for applying a dissipative torque about the axis of precession to neutralize the torque which tends to cause instability by reason of changes of lead.

2. An angular lead measuring device to direct a moving body toward an objective comprising means for indicating a line of sight, an angular rate gyro to be turned with said body and capable of precession, connections for operating the indicating means in proportion to the precession whereby the line of sight from the body to the objective is displaced angularly from the path of motion, and means for applying about the axis of precession a torque proportional to the rate of precession and independent of the amount of precession to neutralize the inherent instability-producing torque introduced by changes of lead.

3. An angular lead measuring device to direct a moving body toward an objective comprising means for indicating a line of sight, an angular rate gyro to be turned with said body and capable of precession, said precession being substantially free of elastic restraint, connections for operating the indicating means in proportion to the precession whereby the line of sight from the body to the objective is displaced angularly from the path of motion, and means for applying about the axis of precession a torque proportional to the rate of precession, the resultant torques acting on the gyro to establish, after substantial decay of transients, a constant lead angle between the path of movement of said body and the line of sight from said body to the objective.

4. A null indicating device for constant angular leads comprising optical means for indicating a line of sight, an angular rate gyro capable of precession through a small angle, damping means having a damping constant (c) opposing motion about the axis of precession substantially in proportion to the rate of precession, the gyro having substantially no restoring torque, connections from the gyro to the optical means to displace the line of sight with respect to the path of motion, the damping coefficient being such that $$\frac{c}{HS_i}$$

is sufficient to neutralize the instability-producing effect due to change of angle between the line of sight and the path of motion of the gyro, where H is the angular momentum of the gyro and $S_i$ is the sensitivity of the optical system.

5. In a sight for determining the path of motion of a craft from which an object is released toward an objective, said object partaking of the velocity of the craft at the instant of release and being thereafter subjected to gravitational acceleration, an angular rate gyro mounted in the craft and capable of precession, sighting means operated by precession of the gyro to introduce a lead angle between the line of sight and the path of the craft, means for applying about the axis of precession a stabilizing torque substantially proportional to the rate of precession, and means for applying about the axis of precession a bias torque to introduce an additional lead angle to compensate for the effect of gravity on said object.

6. In a sight for determining the path of motion of a craft from which an object is released toward an objective, said object partaking of the velocity of the craft at the instant of release and being thereafter subjected to gravitational acceleration, an angular rate gyro mounted in the craft and capable of precession, sighting means operated by precession of the gyro to introduce a lead angle between the line of sight and the path of the craft, means for applying about the axis of precession a stabilizing torque substantially proportional to the rate of precession, and means for applying about the axis of precession a fixed bias torque to introduce an additional lead angle to compensate for the effect of gravity on said object.

7. In a sight for determining the path of motion of a craft from which an object is released toward an objective, said object partaking of the velocity of the craft at the instant of release and being thereafter subjected to gravitational acceleration, an angular rate gyro mounted in the craft and capable of precession, sighting means operated by precession of the gyro to introduce a lead angle between the line of sight and the path of the craft, means for applying to the gyroscope about the axis of precession a stabilizing torque substantially proportional to the rate of precession, and means for applying about the axis of precession a bias torque whose zero-deflection value is variable in accordance with the path of the craft.

8. In a sight for determining the path of motion of a craft from which an object is released toward an objective, said object partaking of the velocity of the craft at the instant of release and being thereafter subjected to gravitational acceleration, an angular rate gyro mounted in the craft and capable of precession, sighting means operated by precession of the gyro to introduce a lead angle between the line of sight and the path of the craft, means for applying to the gyroscope about the axis of precession a stabilizing torque substantially proportional to the rate of precession, and means for applying about the axis of precession a bias torque, said means comprising a weight acted on by gravity and supported in a position offset from the precession axis of the gyro.

9. In a sight for determining the path of motion of a craft from which an object is released toward an objective, said object partaking of the velocity of the craft at the instant of release and being thereafter subjected to gravitational acceleration, an angular rate gyro mounted in the craft and capable of precession, sighting means operated by precession of the gyro to introduce a lead angle between the line of sight and the path of the craft, means for applying about the axis of precession a stabilizing torque substantially proportional to the rate of precession, and means for applying about the axis of precession a bias torque whose zero-deflection value is dependent on the angle of elevation of the craft.

10. In a sight for determining the path of motion of a craft from which an object is released toward an objective, said object partaking of the velocity of the craft at the instant of release and being thereafter subjected to gravitational acceleration, an angular rate gyro mounted in the craft and capable of precession, sighting means operated by precession of the gyro to introduce a lead angle between the line of sight and the path of the craft, means for applying about the axis of precession a stabilizing torque substantially proportional to the rate of precession, and means for applying about the axis of precession a bias torque to compensate for the effect of gravity on said object, said means including a device for applying a fixed torque component and a device for applying a torque component variable with the angle of elevation of the craft.

11. In a sight for determining the path of motion of a craft from which an object is released toward an objective, said object partaking of the velocity of the craft at the instant of release and being thereafter subjected to gravitational acceleration, an angular rate gyro mounted in the craft and capable of precession, sighting means operated by precession of the gyro to introduce a lead angle between the line of sight and the path of the craft, means for applying about said axis of precession a stabilizing torque substantially proportional to the rate of precession, and means for applying about said axis of precession a bias torque to compensate for the effect of gravity on said object, said means including a device for applying a fixed torque component and a weight supported by the gyro in a position offset from the precession axis thereof.

12. In an angular rate gyro having a frame, a bearingless support for the frame including a suspension having a spring tending to centralize the frame in a neutral position, and means for neutralizing the spring comprising a member to apply to the frame a torque in opposition to the torque of the suspension and tending, upon motion of the gyro from the neutral position, to displace the gyro further from the neutral position.

13. A null indicating device for constant angular leads comprising optical means for indicating a line of sight, an angular rate gyro capable of precession through a small angle, viscous damping means opposing motion about the axis of precession substantially in proportion to the rate of precession, the gyro having substantially no restoring torque, connections from the gyro to the optical means to effect angular displacement of the line of sight with respect to the path of motion, the system having a net damping coefficient depending on the value of $$\frac{c}{HS_i}$$

where H is the angular momentum of the gyro and $S_i$ is the sensitivity of the optical system, the value of said net damping coefficient being between 0.05 and 0.50.

14. An angular lead measuring device to direct a moving body toward an objective comprising means for indicating a line of sight, an angular rate gyro to be turned with said body and capable of precession, said precession being substantially free of elastic restraint, connections for operating the indicating means in proportion to the precession whereby the line of sight from the body to the objective is displaced angularly from the path of motion, and damping means for applying about the axis of precession a damping torque, said means having a damping coefficient $c$, the system having a net damping coefficient depending on the value of $$\frac{c}{HS_i}$$

where H is the angular momentum of the gyro and $S_1$ is the sensitivity of the optical system, the value of said net damping coefficient being between 0.05 and 0.50.

15. A null indicating device for constant angular leads comprising means for indicating a line of sight, an angular rate gyro capable of precession through a small angle, said precession being substantially free of elastic restraint, connections for operating the indicating means in accordance with the precession to displace the line of sight with respect to the path of motion, and stabilizing means to neutralize the instability-producing torque which is proportional to the rate of change of angle between the line of sight and the path of motion.

16. An angular lead measuring device to direct a moving body toward an objective comprising means for indicating a line of sight, an angular rate gyro to be turned with said body and capable of precession, said precession being substantially free of elastic restraint, connections for operating the indicating means in proportion to the precession, whereby the line of sight from the body to the objective is displaced angularly from the path of motion, and stabilizing means to neutralize the instability-producing torque which is proportional to the rate of change of angle between the line of sight and the path of motion.

17. In a sight for determining the path of motion of a craft from which an object is released toward an objective, said object partaking of the velocity of the craft at the instant of release and being thereafter subjected to gravitational acceleration, an angular rate gyro mounted in the craft and capable of precession, sighting means operated by precession of the gyro to introduce a lead angle between the line of sight and the path of the craft, stabilizing means to neutralize the instability-producing torque which is proportional to the rate of change of angle between the line of sight and the path of motion, and means for applying about the axis of precession a bias torque to introduce an additional lead angle to compensate for the effect of gravity on said object.

18. In a sight for determining the path of motion of a craft from which an object is released toward an objective, said object partaking of the velocity of the craft at the instant of release and being thereafter subjected to gravitational acceleration, an angular rate gyro mounted in the craft and capable of precession, sighting means operated by precession of the gyro to introduce a lead angle between the line of sight and the path of the craft, stabilizing means to neutralize the instability-producing torque which is proportional to the rate of change of angle between the line of sight and the path of motion, and means for applying about the axis of precession a bias torque whose zero-deflection value is variable in accordance with the path of the craft.

19. In a sight for determining the path of motion of a craft from which an object is released toward an objective, said object partaking of the velocity of the craft at the instant of release and being thereafter subjected to gravitational acceleration, an angular rate gyro mounted in the craft and capable of precession, sighting means operated by precession of the gyro to introduce a lead angle between the line of sight and the path of the craft, stabilizing means to neutralize the instability-producing torque which is proportional to the rate of change of angle between the line of sight and the path of motion, and means for applying about the axis of precession a bias torque, said means comprising a weight acted on by gravity and supported in a position offset from the precession axis of the gyro.

20. A null indicating device for angular leads comprising means for indicating a line of sight, an angular rate gyro capable of precession through a small angle, said precession being substantially free of elastic restraint, connections for operating the indicating means in accordance with the precession to displace the line of sight by an angle $\lambda$ with respect to the path of motion, and thereby introducing an instability-producing torque proportional to $$\frac{d\lambda}{dt}$$

and stabilizing means to neutralize said tendency toward instability for all values of $$\frac{d\lambda}{dt}$$

21. Gyroscopic navigating apparatus comprising a controlled member, a gyroscope having a spin axis and sensitive to rotation about an input axis perpendicular to the spin axis, means for mounting the gyroscope on the controlled member with a single degree of freedom about an output axis perpendicular to both the spin axis and the input axis, means for applying about the output axis a torque resisting gyroscope output deflections and substantially proportional to the rate of said deflections, means for also applying to the gyroscope about the output axis a reference torque, said resisting torque and said reference torque being each independent of the amount of output deflection and means for imparting rotation to the controlled member about said input axis whereby the gyroscope may be maintained at a fixed setting in its mounting means.

22. Gyroscopic navigating apparatus comprising a controlled member, a gyroscope having a spin axis and sensitive to rotation about an input axis perpendicular to the spin axis, means for mounting the gyroscope on the controlled member with a single degree of freedom about an output axis perpendicular to both the spin axis and the input axis, means for applying a viscous damping torque to the gyroscope about the output axis, means for also applying to the gyroscope about the output axis a reference torque, said damping torque and said reference torque being each independent of the amount of output deflection and means for imparting rotation to the controlled member about said input axis whereby the gyroscope may be maintained at a fixed setting in its mounting means.

23. Gyroscopic navigating apparatus comprising a controlled member, two gyroscopes each having mutually perpendicular spin, input and output axes, means for mounting the gyroscopes on the controlled member in different orientations, each gyroscope having a single degree of freedom about its output axis, and means for applying about the output axis of each gyro a resisting torque proportional to the instantaneous rate of angular motion of the gyroscope about its output axis, means for applying to each gyro a reference torque about its output axis, said resisting torques and said reference torques being each independent of the amount of output deflection and means for imparting components of rotation to the controlled member about the input axes of the gyroscopes whereby the gyros may be maintained at fixed settings in their respective mounting means.

References Cited in the file of this patent

UNITED STATES PATENTS

| | | |
|---|---|---|
| Re. 22,330 | Draper | June 8, 1943 |
| 1,057,648 | Lindhard | Apr. 1, 1913 |
| 1,407,191 | Sperry | Feb. 21, 1922 |
| 1,496,087 | Henderson | June 3, 1924 |
| 1,760,163 | Morris | May 27, 1930 |
| 1,831,597 | Henderson | Nov. 10, 1931 |
| 1,900,709 | Henderson | Mar. 7, 1933 |
| 1,919,191 | Bates | July 25, 1933 |
| 1,936,442 | Willard | Nov. 21, 1933 |
| 1,940,387 | Boykow | Dec. 19, 1933 |
| 1,955,488 | Crane et al. | Apr. 17, 1934 |

(Other references on following page)

UNITED STATES PATENTS

| Number | Name | Date |
|---|---|---|
| 2,106,998 | Fieux | Feb. 1, 1938 |
| 2,405,068 | Tear et al. | July 30, 1946 |
| 2,407,191 | Tear et al. | Sept. 3, 1946 |
| 2,408,356 | Willard | Sept. 24, 1946 |
| 2,411,087 | Ford et al. | Nov. 12, 1946 |
| 2,412,453 | Grimshaw | Dec. 10, 1946 |
| 2,414,108 | Knowles et al. | Jan. 14, 1947 |
| 2,432,613 | Fedde | Dec. 16, 1947 |
| 2,433,843 | Hammond et al. | Jan. 6, 1948 |
| 2,440,968 | Moore | May 4, 1948 |
| 2,444,625 | Berins | July 6, 1948 |
| 2,464,195 | Burley et al. | Mar. 8, 1949 |
| 2,501,885 | Barnes et al. | Mar. 28, 1950 |
| 2,584,222 | O'Connor | Feb. 5, 1952 |
| 2,679,366 | Noxon | May 25, 1954 |

FOREIGN PATENTS

| Number | Country | Date |
|---|---|---|
| 162,304 | Great Britain | May 5, 1921 |
| 546,013 | France | Aug. 7, 1922 |
| 749,767 | France | May 15, 1933 |